(12) United States Patent
Nagata et al.

(10) Patent No.: US 11,396,942 B2
(45) Date of Patent: Jul. 26, 2022

(54) SHIFT RANGE CONTROL DEVICE

(71) Applicants: DENSO CORPORATION, Kariya (JP); HONDA MOTOR CO., LTD., Tokyo (JP)

(72) Inventors: Hiromitsu Nagata, Kariya (JP); Koji Sakaguchi, Kariya (JP); Jun Yamada, Kariya (JP); Masahiko Akiyama, Wako (JP); Masashi Misawa, Wako (JP); Kenshi Masuo, Wako (JP)

(73) Assignees: DENSO CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/225,609

(22) Filed: Apr. 8, 2021

(65) Prior Publication Data

US 2021/0222773 A1    Jul. 22, 2021

Related U.S. Application Data

(63) Continuation of application No. PCT/JP2019/039852, filed on Oct. 9, 2019.

(30) Foreign Application Priority Data

Oct. 10, 2018   (JP) .............................. JP2018-191821

(51) Int. Cl.
 *F16H 61/12*  (2010.01)
 *F16H 61/02*  (2006.01)
 *F16H 61/32*  (2006.01)

(52) U.S. Cl.
 CPC ......... *F16H 61/12* (2013.01); *F16H 61/0204* (2013.01); *F16H 61/32* (2013.01);
 (Continued)

(58) Field of Classification Search
 CPC ...... F16H 61/12; F16H 61/0204; F16H 61/32; F16H 2061/1224; F16H 2061/1296;
 (Continued)

(56) References Cited

U.S. PATENT DOCUMENTS 6,317,698 B1 * 11/2001 Prakash ................. B60K 23/08
            180/248
2004/0008002 A1   1/2004 Kamio et al.
(Continued)

FOREIGN PATENT DOCUMENTS

JP          2015-92795          5/2015

*Primary Examiner* — Edwin A Young
(74) *Attorney, Agent, or Firm* — Nixon & Vanderhye P.C.

(57) ABSTRACT

A shift range control device includes a signal receiver, an abnormality monitor, and a drive controller. The signal receiver acquires an encoder signal from an encoder capable of outputting three or more phase encoder signals having different phases. The abnormality monitor monitors an abnormality of the encoder. The drive controller controls drive of a motor by switching an energized phase of a motor winding so that a rotation position of the motor becomes a target rotation position according to a target shift range. When the abnormality of the encoder is detected, the driver controller drives the motor by faulty phase identification control to identify a faulty phase that is a phase in which an abnormality of the encoder signal occurs, and a normal phase in which the encoder signal is normal.

20 Claims, 14 Drawing Sheets

(52) U.S. Cl.
CPC ........... *F16H 2061/1224* (2013.01); *F16H 2061/1296* (2013.01); *F16H 2061/326* (2013.01)

(58) Field of Classification Search
CPC ....... F16H 2061/326; F16H 2061/1232; F16H 2061/1248; F16H 2061/1288
See application file for complete search history.

(56) References Cited

U.S. PATENT DOCUMENTS

| | | |
|---|---|---|
| 2004/0066166 A1 | 4/2004 | Nakai et al. |
| 2006/0006827 A1 | 1/2006 | Nakai et al. |
| 2006/0108966 A1 | 5/2006 | Kamio et al. |
| 2009/0062064 A1* | 3/2009 | Kamada ................. F16H 61/12 477/34 |
| 2013/0076290 A1* | 3/2013 | Yoshida ............. G01D 5/24476 318/652 |
| 2015/0160631 A1* | 6/2015 | Yoshida ................. F16H 61/12 700/275 |
| 2017/0261966 A1 | 9/2017 | Tarui |
| 2019/0383387 A1 | 12/2019 | Kamio |
| 2020/0263788 A1 | 8/2020 | Sakaguchi |
| 2020/0263789 A1 | 8/2020 | Sakaguchi et al. |

* cited by examiner

FIG. 4

| ENCODER PATTERN | | | | | ENERGIZED PHASE |
|---|---|---|---|---|---|
| PATTERN NUMBER | A PHASE | B PHASE | C PHASE | STATE | |
| P0 | 0(Lo) | 0(Lo) | 1(Hi) | NORMAL | V |
| P1 | 0(Lo) | 1(Hi) | 1(Hi) | NORMAL | UV |
| P2 | 0(Lo) | 1(Hi) | 0(Lo) | NORMAL | U |
| P3 | 1(Hi) | 1(Hi) | 0(Lo) | NORMAL | WU |
| P4 | 1(Hi) | 0(Lo) | 0(Lo) | NORMAL | W |
| P5 | 1(Hi) | 0(Lo) | 1(Hi) | NORMAL | VW |
| P6 | 1(Hi) | 1(Hi) | 1(Hi) | ABNORMAL | OFF |
| P7 | 0(Lo) | 0(Lo) | 0(Lo) | ABNORMAL | OFF |

FIG. 6

| ENERGIZED PHASE | ENCODER PATTERN EXPECTED VALUE | | | ENCODER PATTERN DETECTION VALUE | | | DETECTION EXECUTION PROPRIETY | ENERGIZATION ORDER | |
|---|---|---|---|---|---|---|---|---|---|
| | A PHASE | B PHASE | C PHASE | A PHASE | B PHASE | C PHASE | | ROTATION DIRECTION A | ROTATION DIRECTION B |
| V | 0(Lo) | 0(Lo) | 1(Hi) | 0(Lo) | 0(Lo) | 1(Hi) | × | 5 | 3 |
| UV | 0(Lo) | 1(Hi) | 1(Hi) | 0(Lo) | 1(Hi) | 1(Hi) | ○ | 6 | 2 |
| U | 0(Lo) | 1(Hi) | 0(Lo) | 0(Lo) | 1(Hi) | 1(Hi) | × | 1 | 1 |
| WU | 1(Hi) | 1(Hi) | 0(Lo) | 1(Hi) | 1(Hi) | 1(Hi) | ○ | 2 | 6 |
| W | 1(Hi) | 0(Lo) | 0(Lo) | 1(Hi) | 0(Lo) | 1(Hi) | × | 3 | 5 |
| VW | 1(Hi) | 0(Lo) | 1(Hi) | 1(Hi) | 0(Lo) | 1(Hi) | ○ | 4 | 4 |

SHIFT RANGE CONTROL DEVICE

CROSS REFERENCE TO RELATED APPLICATIONS

The present application is a continuation application of International Patent Application No. PCT/JP2019/039852 filed on Oct. 9, 2019, which designated the U.S. and claims the benefit of priority from Japanese Patent Application No. 2018-191821 filed on Oct. 10, 2018. The entire disclosures of all of the above applications are incorporated herein by reference.

TECHNICAL FIELD

The present disclosure relates to a shift range control device.

BACKGROUND

Conventionally, a motor control device for switching a shift range of a vehicle using a motor as a driving source has been known.

SUMMARY

The present disclosure provides a shift range control device including a signal receiver, an abnormality monitor, and a drive controller. The signal receiver acquires an encoder signal from an encoder capable of outputting three or more phase encoder signals having different phases. The abnormality monitor monitors an abnormality of the encoder. The drive controller controls drive of a motor by switching an energized phase of a motor winding so that a rotation position of the motor becomes a target rotation position according to a target shift range. When the abnormality of the encoder is detected, the driver controller drives the motor by faulty phase identification control to identify a faulty phase that is a phase in which an abnormality of the encoder signal occurs, and a normal phase in which the encoder signal is normal.

BRIEF DESCRIPTION OF DRAWINGS

Objects, features and advantages of the present disclosure will become apparent from the following detailed description made with reference to the accompanying drawings. In the drawings:

FIG. 4 is an explanatory diagram illustrating encoder patterns and energized phases according to the encoder patterns according to the first embodiment;

FIG. 6 is an explanatory diagram illustrating a faulty phase identification process when a C-phase Hi fixing abnormality occurs in the first embodiment;

DETAILED DESCRIPTION

Figure 1:
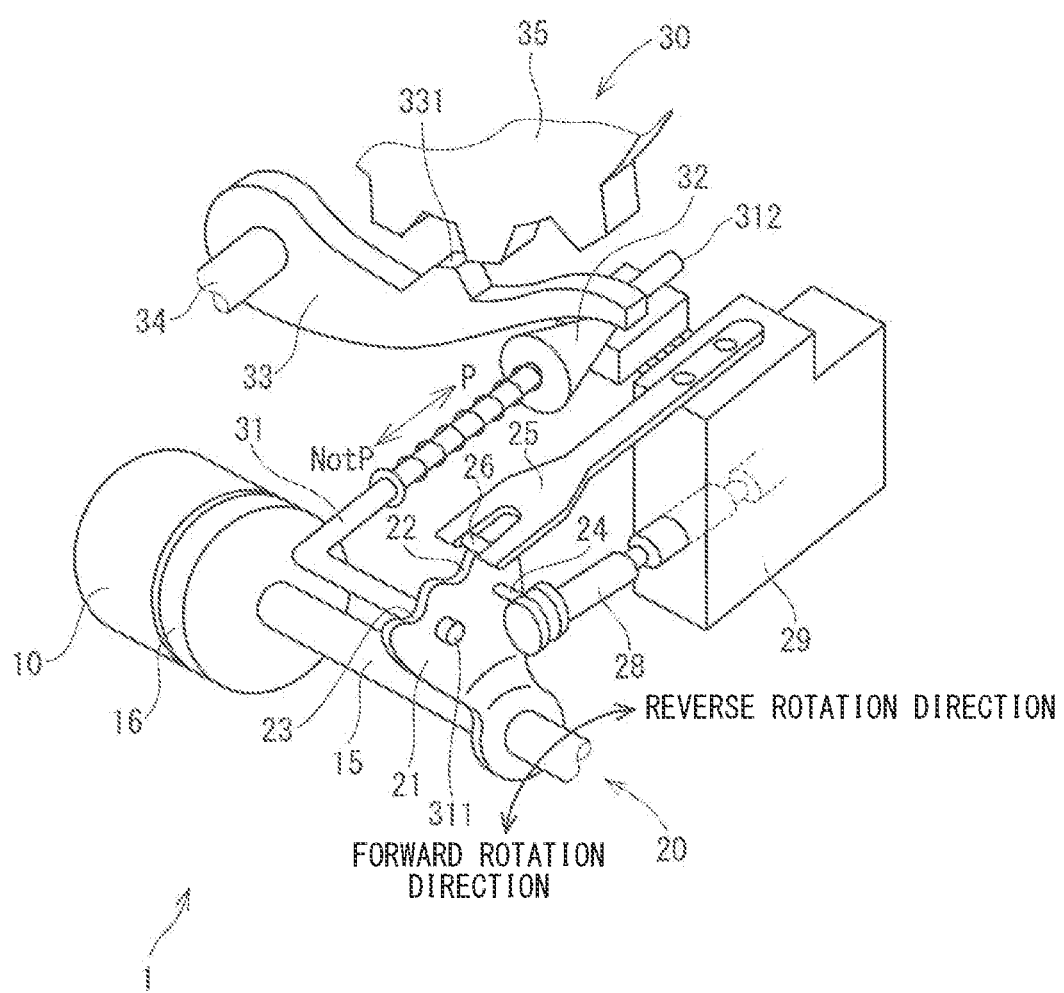
FIG. 1 is a perspective view showing a shift-by-wire system according to a first embodiment.

When a motor control device for switching a shift range of a vehicle using a motor as a driving source detects an abnormality in a feed-back (F/B) control system of the motor, the motor control device may switch a control of the motor to open-loop control that controls the drive of the motor without feeding back information on an encoder count value.

For example, in a case of a two-phase encoder, if one of encoder signals becomes abnormal, the motor control device cannot perform an energization control of the motor and the motor stops.

A shift range control device of the present disclosure controls switching of a shift range by controlling drive of a motor having a three-phase motor winding, and includes a signal receiver, an abnormality monitor, and a drive controller.

The signal receiver acquires an encoder signal from an encoder capable of outputting three or more phase encoder signals having different phases. The abnormality monitor monitors an abnormality of the encoder. The drive controller controls the drive of the motor by switching an energized phase of the motor winding so that a rotation position of the motor becomes a target rotation position according to a target shift range. When the abnormality monitor detects the abnormality of the encoder, the drive controller drives the motor by a faulty phase identification control to identify a faulty phase that is a phase in which an abnormality has occurred in the encoder signal, and a normal phase in which the encoder signal is normal. Accordingly, the abnormality of the encoder is appropriately identified, and the use of the encoder signal of the normal phase can be continued, so that the shift range can be appropriately switched.

A shift range control device will be described with reference to the drawings. Hereinafter, in a plurality of embodiments, substantially the same components are denoted by the same reference numerals, and descriptions of the same components will be omitted.

First Embodiment

Figure 2:
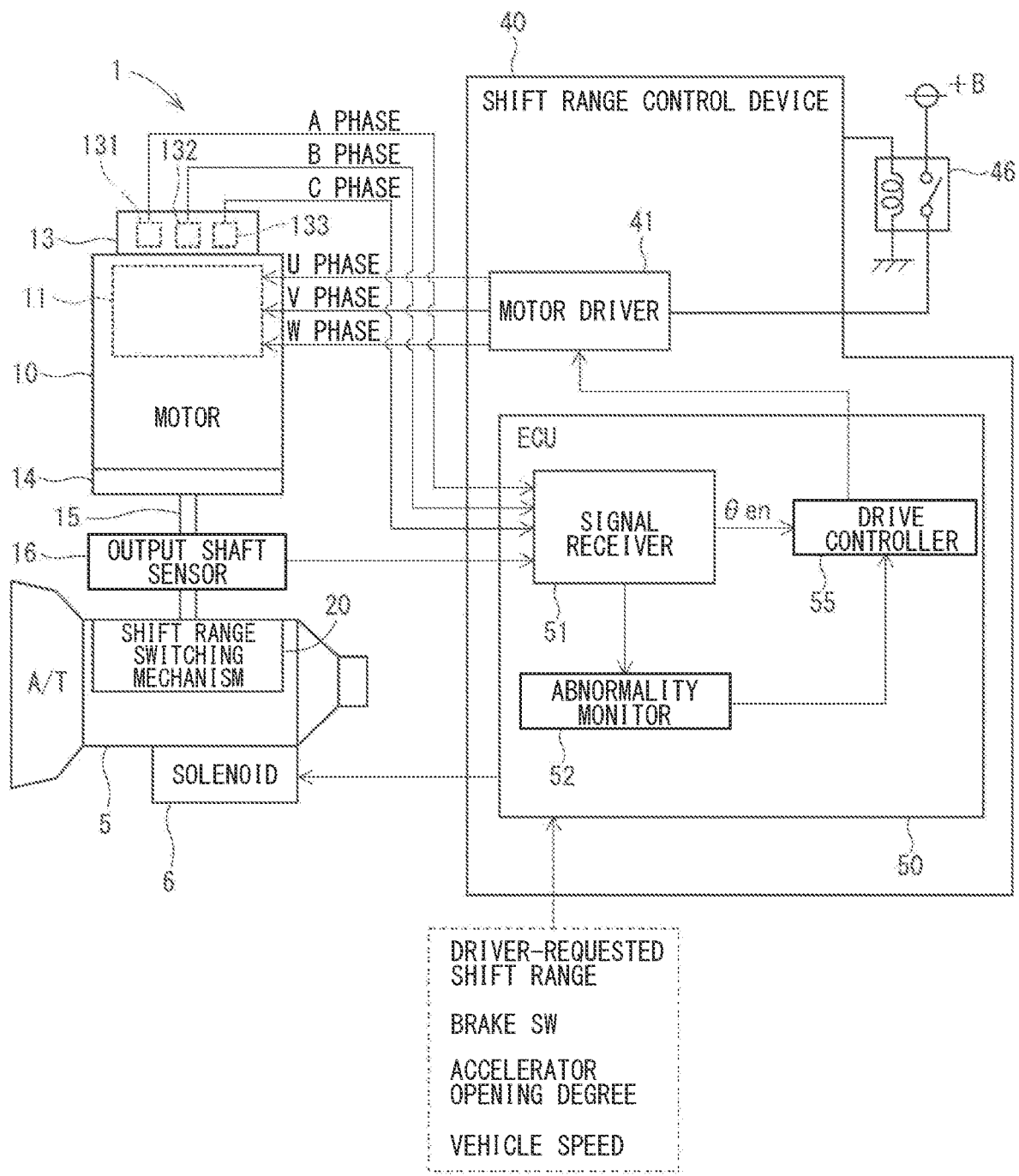
FIG. 2 is a diagram showing a schematic configuration of the shift-by-wire system according to the first embodiment.

A shift range control device according to a first embodiment is shown in FIGS. 1 to 12. As shown in FIGS. 1 and 2, a shift-by-wire system 1 includes a motor 10, a shift range switching mechanism 20, a parking lock mechanism 30, a shift range control device 40, and the like.

The motor 10 rotates while receiving an electric power from a battery mounted on a vehicle (not shown), and functions as a driving source of the shift range switching mechanism 20. The motor 10 of the present embodiment is a switched reluctance motor having a three-phase motor winding 11, but any kind of motor such as a DC motor may be used.

Figure 3:
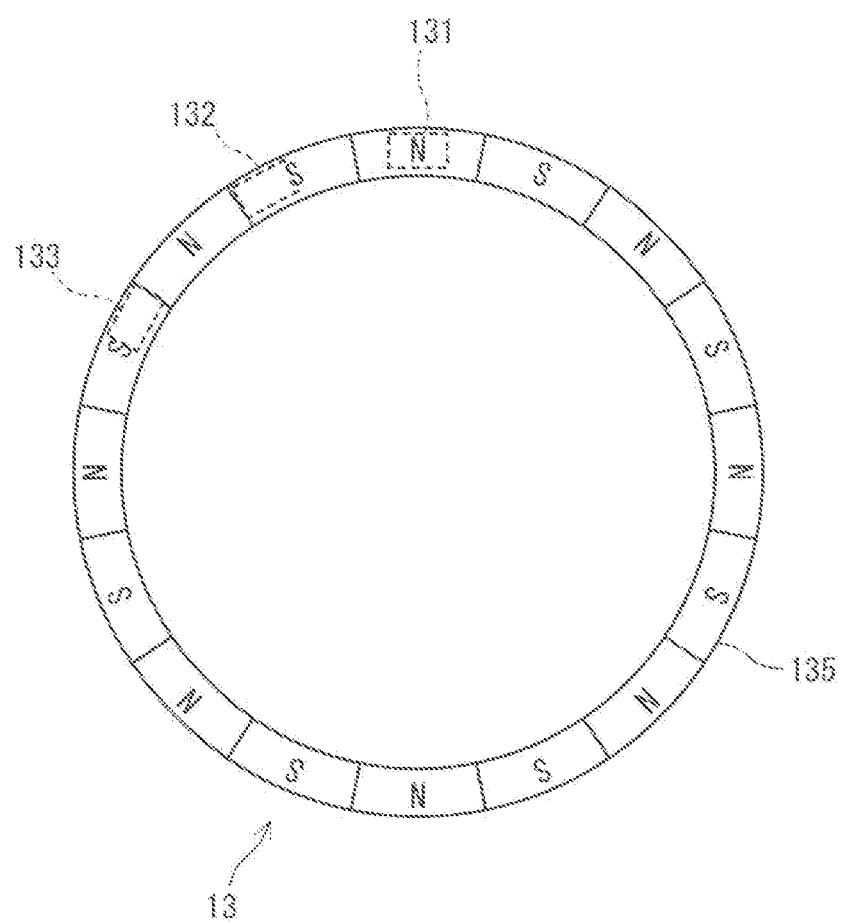
FIG. 3 is a schematic diagram illustrating the arrangement of Hall ICs of an encoder according to the first embodiment.

As shown in FIGS. 2 and 3, the encoder 13 detects a rotation position of a rotor (not shown) of the motor 10 and outputs an encoder signal which is a rotation angle signal corresponding to an electric angle. The encoder 13 is, for example, a magnetic rotary encoder, and is a three-phase encoder having a magnet plate 135 that rotates integrally with the rotor, and Hall ICs 131, 132 and 133 for detecting magnetism. The Hall ICs 131 to 133 each have a Hall element for outputting a voltage corresponding to a direction and magnitude of a magnetic field, and outputs a signal obtained by digitally converting an analog signal of the Hall element to the shift range control device 40 as an encoder signal. As shown in FIG. 3, the Hall ICs 131 to 133 are arranged so that the signal phases are shifted by 120° in the electric angle. Hereinafter, the signal output from the Hall IC 131 is referred to as an A-phase signal, the signal output from the Hall IC 132 is referred to as a B-phase signal, and the signal output from the Hall IC 133 is referred to as a C-phase signal.

A speed reducer 14 is provided between a motor shaft of the motor 10 and an output shaft 15 to decelerate the rotation of the motor 10 and output the decelerated rotation to the output shaft 15. As a result, the rotation of the motor 10 is transmitted to the shift range switching mechanism 20. The output shaft 15 is provided with an output shaft sensor 16 for detecting an angle of the output shaft 15. The output shaft sensor 16 is, for example, a potentiometer.

As shown in FIG. 1, the shift range switching mechanism 20 includes a detent plate 21, a detent spring 25 and the like. The shift range switching mechanism 20 transmits the rotational drive force output from the speed reducer 14 to a manual valve 28 and the parking lock mechanism 30.

The detent plate 21 is fixed to the output shaft 15 and driven by the motor 10. In the present embodiment, a direction in which the detent plate 21 is separated from a base of the detent spring 25 is defined as a forward rotation direction, and a direction in which the detent plate 21 approaches the base is defined as a reverse rotation direction.

The detent plate 21 has a pin 24 protruding in parallel with the output shaft 15. The pin 24 is connected to the manual valve 28. When the detent plate 21 is driven by the motor 10, the manual valve 28 reciprocates in an axial direction. In other words, the shift range switching mechanism 20 converts a rotational motion of the motor 10 into a linear motion and transmits the linear motion to the manual valve 28. The manual valve 28 is provided in a valve body 29. When the manual valve 28 reciprocates in the axial direction, a hydraulic supply path to a hydraulic clutch (not shown) is switched, and an engagement state of the hydraulic clutch is switched. In this way, the shift range is switched.

The detent plate 21 is provided with two recesses 22 and 23 at portions close to the detent spring 25. In the present embodiment, one recess closer to the base of the detent spring 25 is defined as the recess 22, and the other recess farther from the base of the detent spring 25 is defined as the recess 23. In the present embodiment, the recess 22 corresponds to a NotP range other than a P range, and the recess 23 corresponds to the P range.

The detent spring 25 is an elastically deformable plate-like member, and is provided with a detent roller 26 at a tip of the detent spring 25. The detent spring 25 urges the detent roller 26 toward the center of rotation of the detent plate 21. When a rotational force equal to or greater than a predetermined force is applied to the detent plate 21, the detent spring 25 is elastically deformed, and the detent roller 26 moves between the recesses 22 and 23. When the detent roller 26 is fitted into any one of the recesses 22 and 23, the swinging motion of the detent plate 21 is regulated, the axial position of the manual valve 28 and the state of the parking lock mechanism 30 are determined, and the shift range of an automatic transmission 5 is fixed. The detent roller 26 fits into the recess 22 when the shift range is the NotP range, and fits into the recess 23 when the shift range is the P range.

The parking lock mechanism 30 includes a parking rod 31, a conical body 32, a parking lock pawl 33, a shaft part 34 and a parking gear 35. The parking rod 31 is formed in a substantially L-shape, and one end 311 is fixed to the detent plate 21. The other end 312 of the parking rod 31 is provided with the conical body 32. The conical body 32 is formed to reduce in diameter toward the other end 312. When the detent plate 21 swings in the reverse rotation direction, the conical body 32 moves in a P direction.

The parking gear 35 is provided on an axle (not shown) so as to be capable of meshing with a protrusion 331 of the parking lock pawl 33. When the parking gear 35 meshes with the protrusion 331, the rotation of the axle is restricted. When the shift range is the NotP range, the parking gear 35 is not locked by the parking lock pawl 33, and the rotation of the axle is not hindered by the parking lock mechanism 30. When the shift range is the P range, the parking gear 35 is locked by the parking lock pawl 33 and the rotation of the axle is restricted.

As shown in FIG. 2, the shift range control device 40 includes a motor driver 41, an electronic control unit (ECU) 50 which is a controller, and the like. The motor driver 41 switches energization to each phase (U-phase, V-phase, and W-phase) of the motor 10. A motor relay 46 is provided between the motor driver 41 and the battery. The motor relay 46 is turned on when a start switch of a vehicle, such as an ignition switch, is turned on, so that electric power is supplied to the motor 10. The motor relay 46 is turned off when the start switch is off, and the supply of the electric power to the motor 10 is cut off.

ECU 50 is mainly composed of a microcomputer and the like, and internally includes a CPU, a ROM, a RAM, an I/O, a bus line for connecting these components, and the like, which are not shown. Each processing in the ECU 50 may be software processing by executing a program stored in advance in a tangible memory device (that is, a readable non-transitory tangible recording medium) such as the ROM by the CPU, or may be hardware processing by a dedicated electronic circuit.

The ECU 50 controls the switching of the shift range by controlling the drive of the motor 10 based on a driver-requested shift range, a signal from a brake switch, a vehicle speed, and the like. The ECU 50 controls the drive of a shift hydraulic control solenoid 6 based on the vehicle speed, an accelerator opening degree, the driver requested shift range, and the like. By controlling the shift hydraulic control solenoid 6, the shift stage is controlled. The number of the shift hydraulic control solenoids 6 is determined according to the number of shift stages or the like. In the present embodiment, one ECU 50 controls the drive of the motor 10 and the solenoid 6, but a motor ECU for controlling the motor 10 and an AT-ECU for controlling the solenoid may be separated from each other. Hereinafter, a drive control of the motor 10 will be mainly described.

The ECU 50 has a signal receiver 51, an abnormality monitor 52, and a drive controller 55. The signal receiver 51 acquires the encoder signal from the encoder 13 and the signal from the output shaft sensor 16. The signal receiver 51 reads an encoder pattern for each pulse edge interruption of the encoder signal from the encoder 13. The signal receiver 51 counts up or counts down an encoder count value θen for each encoder pulse edge in accordance with the signal pattern. The abnormality monitor 52 monitors an abnormality of the encoder signal.

The drive controller 55 controls the drive of the motor 10 so that the motor 10 stops at a rotation position where the encoder count value θen becomes a target count value θcmd corresponding to a target shift range acquired from a higher-level ECU (not shown). In the present embodiment, the motor 10 is rotated by switching an energized phase based on the encoder signal. In the present embodiment, the encoder count value θen corresponds to a "rotational position of the motor" and the target count value ecmd corresponds to a "target rotational position".

The encoder signal and the energized phase corresponding to the encoder signal will be described with reference to FIG. 4. In FIG. 4, the numbers P0 to P7 are signal patterns and pattern numbers indicating energized phase patterns according to the signal patterns. In the figure, the state in which the encoder signal is Lo is described as "0 (Lo)", and the state in which the encoder signal is Hi is described as "1 (Hi)". The same applies to FIG. 6.

Pattern P0: A signal pattern in which the A-phase signal and the B-phase signal are Lo and the C-phase signal is Hi is defined as a pattern P0, and the energized phase at this time is a V-phase.

Pattern P1: A signal pattern in which the A-phase signal is Lo, and the B-phase signal and the C-phase signal are Hi is defined as a pattern P1, and the energized phases at this time are a U-phase and the V-phase.

Pattern P2: A signal pattern in which the A-phase signal and the C-phase signal are Lo and the B-phase signal is Hi is defined as a pattern P2, and the energized phase at this time is the U-phase.

Pattern P3: A signal pattern in which the A-phase signal and the B-phase signal are Hi and the C-phase signal is Lo is defined as a pattern P3, and the energized phases at this time are a W-phase and the U-phase.

Pattern P4: A signal pattern in which the A-phase signal is Hi, and the B-phase signal and the C-phase signal are Lo is defined as a pattern P4, and the energized phase at this time is the W-phase.

Pattern P5: A signal pattern in which the A-phase signal and the C-phase signal are Hi and the B-phase signal is Lo is defined as a pattern P5, and the energized phases at this time are the V-phase and the W-phase.

The patterns P0 to P5 are normal patterns. When the motor 10 is rotated, the energized phase is switched in the order of V, UV, U, WU, W, WV, VW, V, UV and so on according to the signal pattern for each edge interruption of the encoder signal from the encoder 13. In the case of rotating in the reverse direction, the energized phase is switched in the reverse order.

Patterns P6 and P7: A signal pattern in which the A-phase signal, the B-phase signal, and the C-phase signal are all Hi is defined as a pattern P6, and a signal pattern in which the A-phase signal, the B-phase signal, and the C-phase signal are all Lo is defined as a pattern P7. The patterns P6 and P7 in which the A-phase signal, the B-phase signal, and the C-phase signal are all Hi or Lo are abnormal patterns that do not occur in the normal state. For example, as shown by the dashed dotted line in FIG. 7, when the C-phase signal is Hi-fixed due to a C-phase disconnection of the encoder 13, the pattern P6 occurs at the timing when the pattern P3 should occur. For the sake of description, the Hi fixing signal generated at the time of the C-phase disconnection is deviated from the Hi signal in the normal state.

By the way, as a reference example, in a two-phase encoder system of the A-phase and the B-phase, if a signal of one phase becomes abnormal due to, for example, disconnection or the like, the energization control of the motor cannot be correctly performed, and therefore, the motor immediately stops. As a supplement, since a reference signal such as a Z-phase pulse is not a "rotation angle signal", the reference signal cannot be used for motor control.

On the other hand, in the present embodiment, the encoder 13 is a three-phase encoder system including the A-phase, the B-phase, and the C-phase. In the case of the three-phase encoder system, as described with reference to FIG. 4, the energized phase is uniquely determined with respect to the signal pattern. Therefore, in the present embodiment, when an abnormality of the encoder signal is detected, the motor 10 is driven by faulty phase identification control to identify the faulty phase, and after the faulty phase is identified, the motor 10 is driven by fault time feedback control that is feedback control using the encoder signal of the normal phase.

Figure 5:
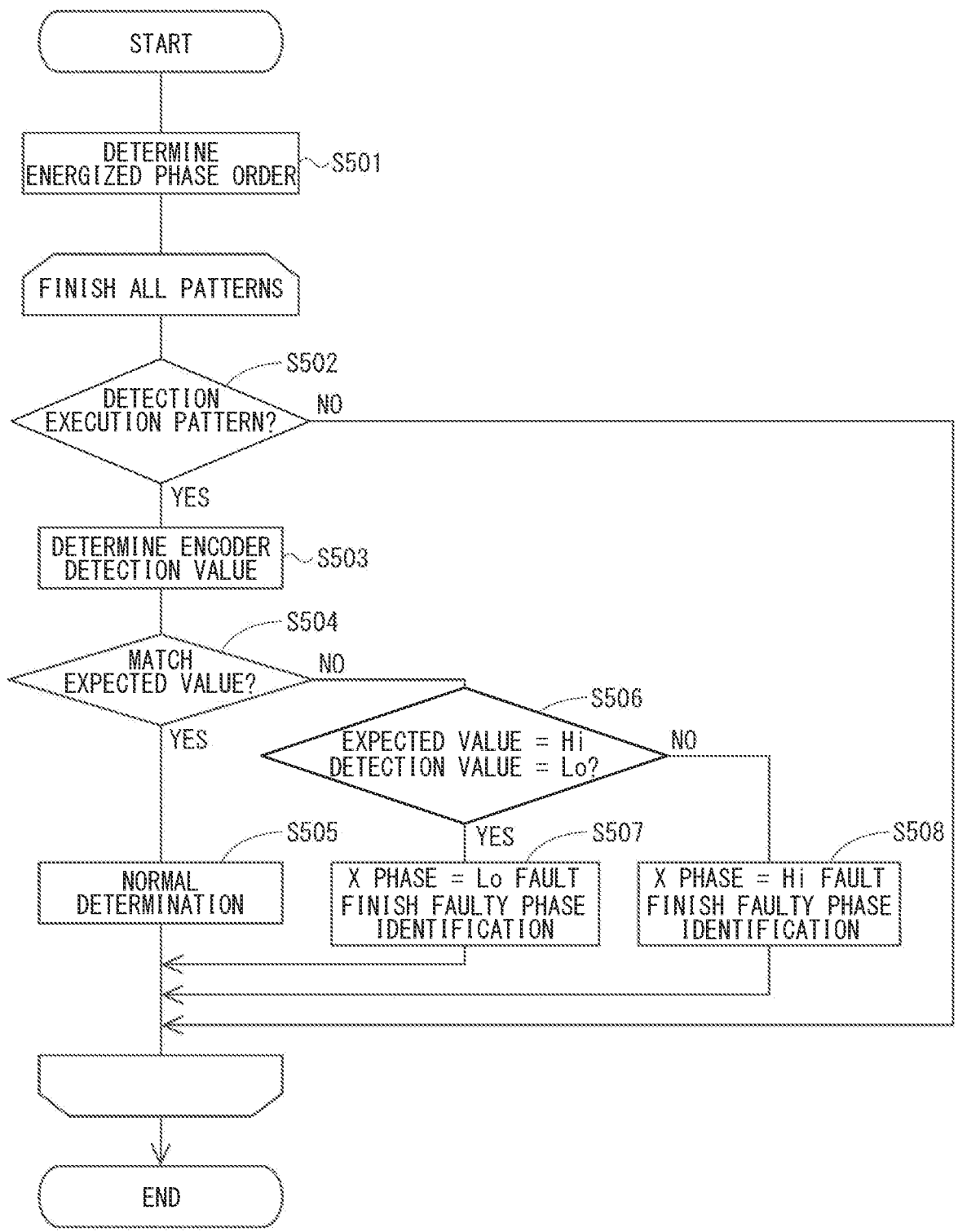
FIG. 5 is a flowchart illustrating a faulty phase identification process according to the first embodiment.

A faulty phase identification process of the present embodiment will be described with reference to the flowchart of FIG. 5. This process is executed when an abnormality of the encoder signal is detected.

In S501, the ECU 50 determines an energized phase order based on the rotation direction of the motor 10. The processes of S502 to S508 are processes that are repeatedly executed for all the energization patterns. If the faulty phase is identified in S507 or S508, the remaining processes may be cancelled.

In S502, the abnormality monitor 52 determines whether or not the present energization pattern is a detection execution pattern. In the present embodiment, two-phase energization, that is, the patterns P1, P3, P5 are set as detection execution patterns, and the faulty phase identification is not executed at a time of one-phase energization, that is, at times of the patterns P0, P2, and P4. When it is determined that the present energization pattern is not the detection execution pattern (S502: NO), that is, when the present energization pattern is P0, P2, or P4, the processes of S503 to S508 are not performed and the process returns to a loop start end. When it is determined that the present energization pattern is the detection execution pattern (S502: YES), the process proceeds to S503.

In S503, the abnormality monitor 52 determines an encoder detection value after a predetermined time has elapsed from the start of energizing the energized phase. In S504, the abnormality monitor 52 determines whether or not the present encoder detection value matches the encoder expected value expected from the energized phase. When it is determined that the encoder detection value and the encoder expected value match (S504: YES), the process proceeds to S505, and it is determined that the encoder detection value is normal. When it is determined that the encoder detection value and the encoder expected value do not match (S504: NO), the process proceeds to S506.

In S506, the abnormality monitor 52 determines whether or not the expected value is Hi and the detected value is Lo for the X phase in which the detected value and the expected value are different. When it is determined for the X phase that the expected value is Hi and the detected value is Lo (S506: YES), the process proceeds to S507, it is identified that a Lo-fixing abnormality has occurred in the X phase, and the faulty phase identification is finished. When it is determined for the X phase that the expected value is Lo and the detected value is Hi (S506: NO), the process proceeds to S508, it is identified that a Hi-fixing abnormality has occurred in the X phase, and the faulty phase identification is finished. The processes of S507 and S508 may be omitted and it is not necessary to identify the Hi-fixing abnormality or the Lo-fixing abnormality.

A specific example of the faulty phase identification process is shown in FIG. 6. As shown in FIG. 6, if the rotation direction when an encoder abnormality occurs is the forward direction ("rotation direction A" in the figure), energization is performed in the order of U, WU, W, VW, V, UV in the faulty phase identification control. If the rotation direction when the encoder abnormality occurs is the reverse direction ("rotation direction B" in the figure), energization is performed in the order of U, UV, V, VW, W, WU in the faulty phase identification control. As described above, since the faulty phase identification is performed during the UV phase energization, the WU phase energization, and the VW phase energization, which are two-phase energization, the energization time is secured to the extent that the encoder pattern becomes stable. On the other hand, since the faulty phase identification is not performed during the U-phase energization, the V-phase energization, and the W-phase energization, which are one-phase energization, the energization time may be shorter than that during the two-phase energization, and it is sufficient to energize to the extent that the energization phase can be switched stably.

FIG. 6 shows an example in which a C-phase Hi fixing abnormality occurs. If the C-phase encoder signal is normal, the C-phase encoder signal will be Lo when the U-phase, WU-phase, and W-phase are energized. However, if a Hi-fixing abnormality has occurred, the C-phase encoder signal will be Hi. In the present embodiment, since the faulty phase identification is performed during the two-phase energization, the expected value and the detected value do not match when the WU phase is energized, and it is possible to identify that a Hi-fixing abnormality has occurred in the C phase. Moreover, since no abnormality has occurred in the A phase and the B phase, the A-phase and the B-phase are identified as normal phases.

In the present embodiment, since the three-phase encoder is used as the encoder 13, the faulty phase can be identified by the faulty phase identification process. If the faulty phase is identified, the information on the pulse edge of the normal phase in which no fault has occurred can be used, so that the motor 10 can be driven by feedback control using the encoder signal of the normal phase. Hereinafter, feedback control using the all-phase encoder signals will be referred to as normal time feedback control, and feedback control using normal phase encoder signals without using faulty phase signals will be referred to as fault time feedback control.

Figure 7:
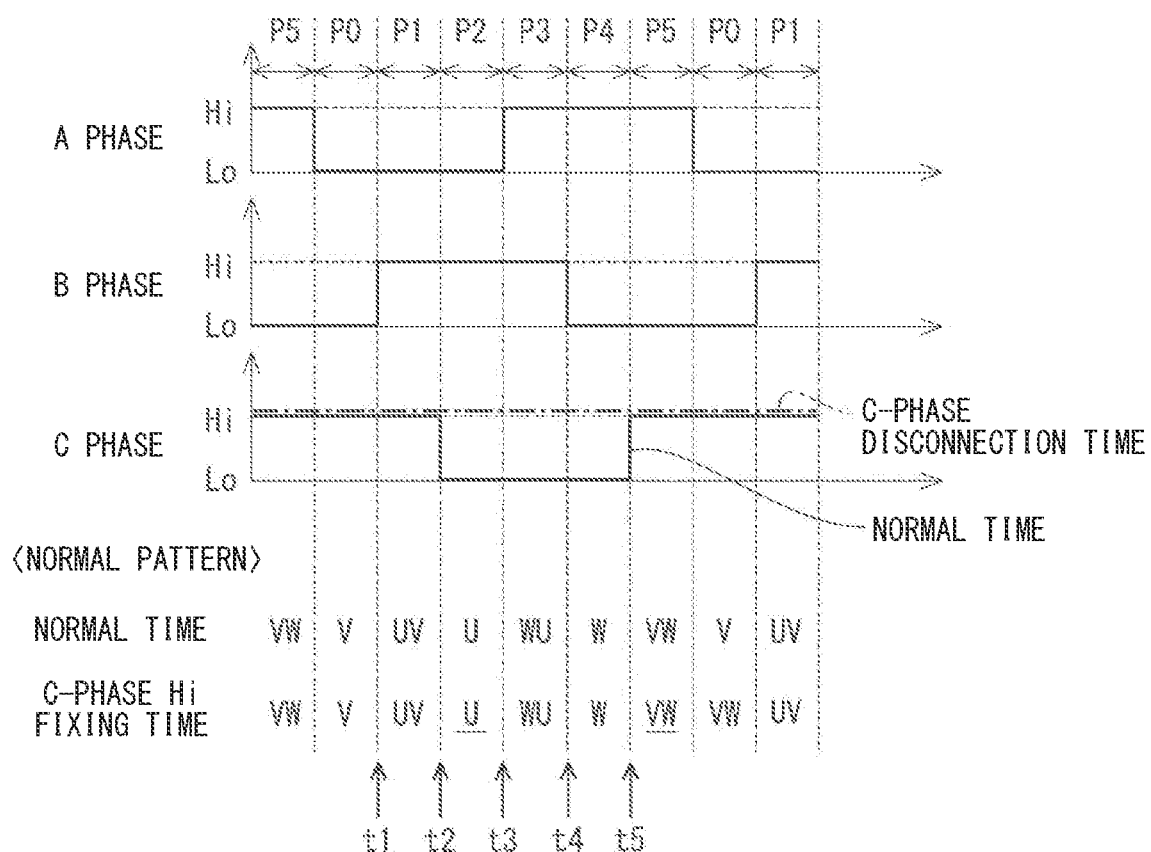
FIG. 7 is an explanatory diagram illustrating fault time feedback control at a time when a C-phase Hi fixing abnormality occurs according to the first embodiment.

The switching of the energized phase will be described with reference to FIG. 7. In FIG. 7, for simplification of the description, the energized phase is switched at the same timing between when the encoder is normal and when the encoder is abnormal.

First, switching of the energized phase in the normal time feedback control will be described. When the energized phase is the VW phase, the encoder pattern is P5, the A-phase signal and the C-phase signal are Hi, and the B-phase signal is Lo. When the A-phase signal is switched from Hi to Lo, the energized phase is switched from the VW phase to the V phase. Next, when the B-phase signal is switched from Lo to Hi, the energized phase is switched from the V phase to the UV phase, and so on, and the energized phase is switched each time the pulse edge of the encoder signal is detected.

Next, switching of the energized phase in the fault time feedback control when the C-phase Hi fixing occurs will be described. At the timing t1, the energized phase is switched from the V phase to the UV phase based on a rising edge of the B-phase signal that is normal. At the timing t2 at which the C-phase signal switches from Hi to Lo when the C-phase signal is normal, a falling edge of the C-phase signal cannot be detected. In the present embodiment, since the C-phase fault is confirmed, with respect to a C-phase edge generation point, the energized phase is switched after an energization switching time Tc has elapsed from the start of the energization pattern immediately before the C-phase edge generation. That is, the energized phase is switched from the UV phase to the U phase at the timing when the energization switching time Tc has elapsed from the start timing t1 of the pattern P1.

Since the A-phase signal and the B-phase signal are normal, the energized phase is switched based on the edge of the encoder signal at the switching timing t3 from the U-phase energization to the WU-phase energization and the switching timing t4 from the WU-phase energization to the W-phase energization.

At the timing t5 at which the C-phase signal switches from Lo to Hi in the normal state, the rising edge of the C-phase signal cannot be detected. Thus, the energized phase is switched from the W phase to the VW phase at the timing t5 at which the energization switching time Tc has elapsed from the timing t4 at which the energization pattern becomes the pattern P4 that is the energization pattern immediately before.

As described above, at the pulse edge generation timing of the faulty phase, the feedback control using the encoder signal of the normal phase can be continued by switching the energized phase with time even after the encoder abnormality occurs. In the example of FIG. 7, the switching to the U-phase energization and the switching to the VW phase energization, for which the energized phases in the disconnection time are underlined, are performed according to the elapsed time from the pulse edge detection timing of the normal phase.

A mode selection process of the present embodiment will be described with reference to the flowchart of FIG. 8. This process is executed by the ECU 50 at a predetermined cycle. The control cycle of each control process may be the same or different.

In S101, the ECU 50 determines whether or not the present drive mode is a standby mode. When it is determined that the drive mode is not the standby mode (S101: NO), the process proceeds to S103. If it is determined that the drive mode is the standby mode (YES in S101), the process proceeds to S102.

In S102, the ECU 50 determines whether or not an actual range and the target shift range match. The actual range is detected based on, for example, the detection value of the output shaft sensor 16. When it is determined that the actual range and the target shift range match (S102: YES), the standby mode is maintained without performing the processes after S103. When it is determined that the actual range and the target shift range do not match (S102: NO), the process proceeds to S103.

In S103, it is determined whether or not the rotation position of the motor 10 has reached a target position. In the present embodiment, when the encoder count value θen falls within a predetermined range (for example, ±2 counts)

including the target count value θcmd, it is determined that the rotation position has reached the target position. If the fault time feedback control is being performed, a value estimated based on the pulse edge of the normal phase is used as the encoder count value. When it is determined that the rotation position of the motor 10 has reached the target position (S103: YES), the process proceeds to S109. When it is determined that the rotation position of the motor 10 has not reached the target position (S103: NO), the process proceeds to S104.

In S104, the ECU 50 determines whether or not the encoder 13 is normal. When it is determined that the encoder 13 is normal (S104: YES), the process proceeds to S105, and the control mode is set to a normal time feedback control mode. The feedback is described as "FB" as appropriate in the figure. When it is determined that the encoder 13 is not normal (S104: NO), the process proceeds to S106.

In S106, the ECU 50 determines whether or not the faulty phase has been identified. When it is determined that the faulty phase has been identified (S106: YES), the process proceeds to S107, and the control mode is set to a fault time feedback control mode. When it is determined that the faulty phase has not been identified (S106: NO), the process proceeds to S108.

In S108, the ECU 50 sets the control mode as a faulty phase identification mode. In addition, the ECU 50 notifies a user of information that an abnormality has occurred in the shift-by-wire system 1, for example, by turning on a warning lamp of an instrument panel. The fault notification method may be any method such as voice notification.

In S109 to which the process proceeds when it is determined that the rotation position of the motor 10 has reached the target position (S103: YES), it is determined whether or not a stop control time has elapsed from the start of a stop control. The stop control time is set according to the time during which the motor 10 can be reliably stopped by the stop control. The stop control is, for example, fixed-phase energization control, but may be other than fixed-phase energization control. When it is determined that the stop control time has not elapsed (S109: NO), the process proceeds to S110, and the control mode is set to a stop control mode. When it is determined that the stop control time has elapsed (S109: YES), the process proceeds to S111 and the control mode is set to the standby mode.

Figure 9:
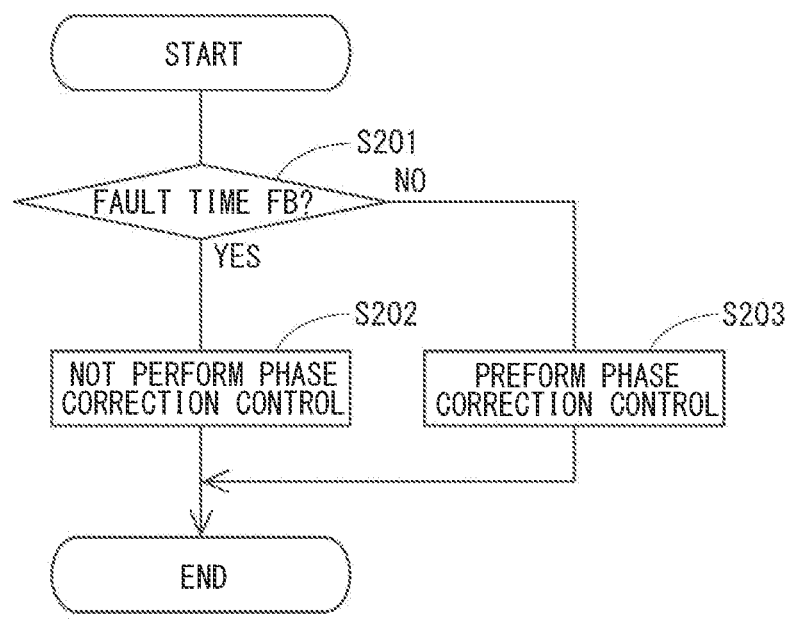
FIG. 9 is a flowchart illustrating an energization time correction execution determination process according to the first embodiment.

FIG. 9 is a flowchart illustrating an energization time correction execution determination process. This process is a process executed at a predetermined cycle when the control mode is the normal time feedback control mode or the fault time feedback control mode.

In S201, it is determined whether or not the control mode is the fault time feedback control mode. When it is determined that the control mode is the fault time feedback control mode (S201: YES), the process proceeds to S202, a phase correction control is not performed, and the energized phase according to the encoder pattern is energized. When it is determined that the control mode is not the fault time feedback control mode (S201: NO), that is, in the normal feedback control mode, the process proceeds to S203, a phase of the energized phase according to present encoder pattern is corrected, and the phase-corrected energized phase is energized. The phase correction amount, which is the phase lead amount or the phase delay amount, is determined by, for example, a map calculation according to the motor rotation speed, which is the motor speed.

The fault time feedback control process will be described with reference to the flowchart of FIG. 10. In S301, the ECU 50 determines whether or not a first time completion flag Flg_f is turned on. When it is determined that the first time completion flag Flg_f is turned on (S301: YES), the process proceeds to S306. When it is determined that the first time completion flag Flg_f is not turned on (S301: NO), the process proceeds to S302.

In S302, the ECU 50 determines whether or not a first time energization duration T1 has elapsed from the start of energization to the specific phase (for example, the UV phase). The first time energization duration T1 is set according to the time required for the rotor to rotate to an appropriate position with respect to the energized phase. In the present embodiment, two teeth of the rotor face two phases of the stator by energizing the specific two phases as the first time energization. As a result, even if the rotor rotates while the motor is stopped, the fault time feedback control process can be appropriately performed. When it is determined that the first time energization duration T1 has elapsed (S302: YES), the process proceeds to S305. When it is determined that the first time energization duration T1 has not elapsed (S302: NO), the process proceeds to S303.

In S303, the ECU 50 determines whether or not the edge of the normal phase of the encoder 13 has been detected. When it is determined that the edge of the normal phase is detected (S303: YES), the process proceeds to S305. If it is determined that the edge of the normal phase has not been detected (S303: NO), the process proceeds to S304. In S304, the drive controller 55 performs first time energization to the specific phase. If the specific phase is being energized, the specific phase is continuously energized.

In S305 to which the process proceeds when the first time energization duration T1 has elapsed (S302: YES) or the edge of the normal phase has been detected (S303: YES), the energized phase is switched to the next energized phase, and the first time completion flag Flg_f is turned on.

In S306 to which the process proceeds when the first time completion flag Flg_f is turned on, the ECU 50 determines whether or not the energized phase has been switched. When it is determined that the energized phase has not been switched (S306: NO), the process of S307 is not performed and the process proceeds to S308. When it is determined that the energized phase has been switched (S306: YES), the process proceeds to S307, and the energization switching time Tc is calculated. The energization switching time Tc is set according to an edge generation interval when the encoder 13 is normal. Specifically, the energization switching time Tc is set to be longer than an estimated edge generation interval and shorter than a period until the next edge is generated. In the present embodiment, the energization switching time Tc is variable according to the rotation speed of the motor 10.

In S308, the ECU 50 determines whether or not the encoder pattern has changed. When it is determined that the encoder pattern has not changed (S308: NO), the process proceeds to S313. When it is determined that the encoder pattern has changed (S308: YES), the process proceeds to S309.

In S309, the ECU 50 determines whether or not the edge of the detected encoder signal is the edge of the normal phase. When it is determined that the edge of the detected encoder signal is the edge of the normal phase (S309: YES), the process proceeds to S312. When it is determined that the detected edge is not the edge of the normal phase (S309: NO), the process proceeds to S310.

In S310, the ECU 50 determines whether or not the edge of the detected encoder signal is an appropriate edge of the faulty phase to be detected next in the present energized phase. When it is determined that the detected edge is not the appropriate edge (S310: NO), the edge is skipped, the process proceeds to S315, and the present energized phase is maintained. When it is determined that the detected edge is the appropriate edge (S310: YES), the process proceeds to S311 and the faulty phase is restored to normal. A counter or the like may be provided so that the faulty phase can be restored to normal by detecting the appropriate edge a plurality of times, and the edge of the faulty phase may be skipped until the normal edge is restored. In S312, the energized phase is switched according to the encoder pattern.

In S313 to which the process proceeds when it is determined that the encoder pattern has not changed (S308: NO), the ECU 50 determines whether or not the edge to be detected next in the present energized phase is the faulty phase. When it is determined that the edge of the encoder signal to be detected next is not the faulty phase (S313: NO), the process proceeds to S315 and the present energized phase is maintained. When it is determined that the edge of the encoder signal to be detected next is the faulty phase (S313: YES), the process proceeds to S314.

In S314, it is determined whether or not the energization switching time Tc has elapsed from the start of the energization of the current energization phase. When it is determined that the energization switching time Tc has not elapsed (S314: NO), the process proceeds to S315 and the present energized phase is maintained. When it is determined that the energization switching time Tc has elapsed (S314: YES), the process proceeds to S316 and the energized phase is switched to the next.

Figure 11:
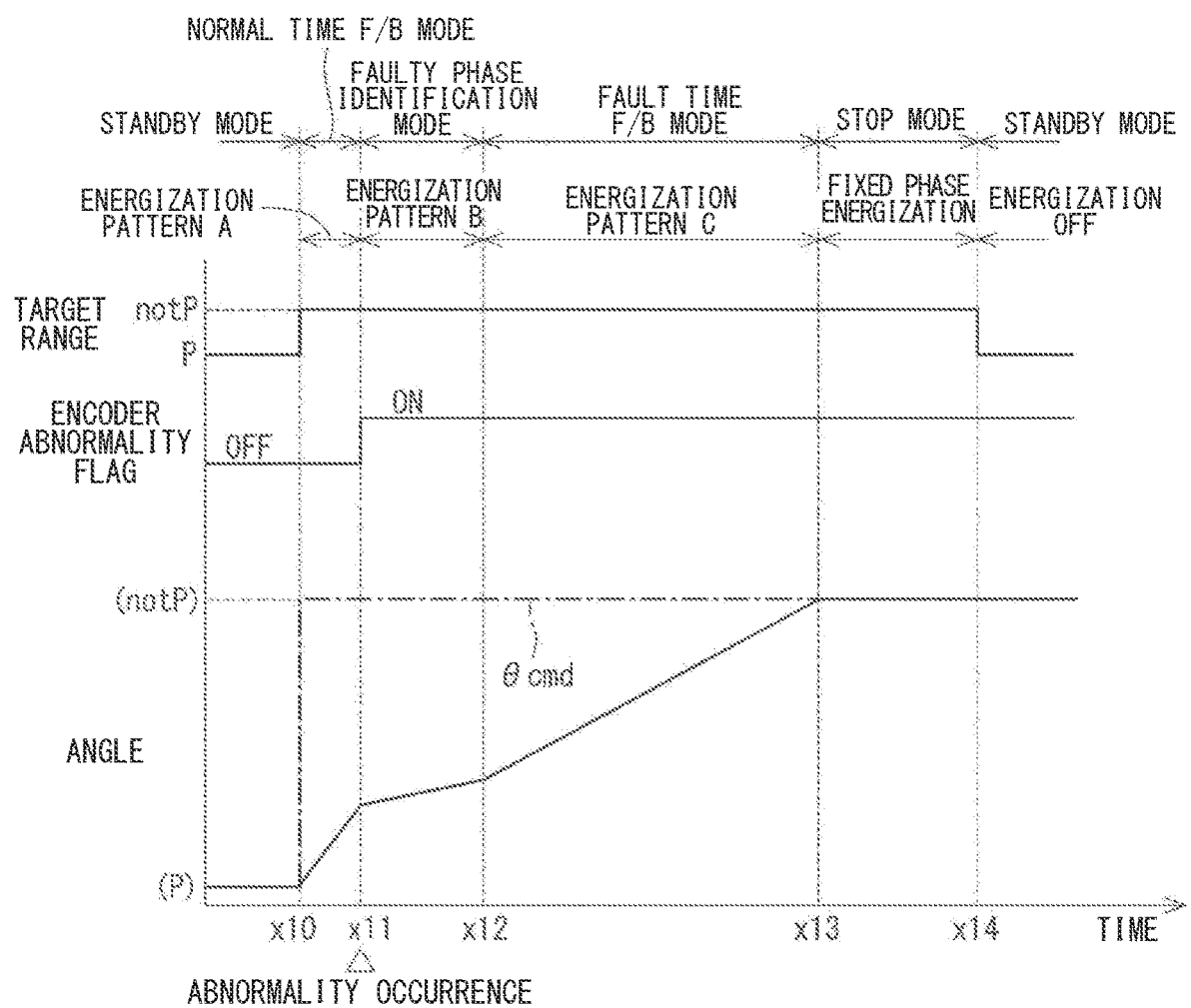
FIG. 11 is a time chart illustrating a motor driving process according to the first embodiment.

A motor driving process according to the present embodiment will be described with reference to the time chart of FIG. 11. FIG. 11 shows an example in which an encoder abnormality occurs while driving the motor, and shows the target shift range, an encoder abnormality flag, and a motor angle from an upper row. For the motor angle, the actual motor rotation position is indicated by a solid line, and the target count value θcmd is indicated by a dashed dotted line. The actual motor rotation position is a value corresponding to the encoder count value θen, and includes an estimated value when the encoder is abnormal. Further, the angle corresponding to the P range is described as (P), and the angle corresponding to the NotP range is described as (NotP). It is noted that, for the purpose of explanation, the time scale and the like are changed appropriately. Here, a case where the shift range is switched from the P range to the NotP range will be described as an example. The same applies to FIG. 12 and FIG. 14.

In the time chart, the energization pattern during the normal time feedback control using all-phase encoder signals is energization pattern A, the energization pattern during the faulty phase identification process is energization pattern B, the energization pattern during the fault time feedback control using the normal phase encoder signals is the energization pattern C, and the first energization when the shift range is switched from the state where the encoder is abnormal and the faulty phase is identified is the energization pattern D.

When the target shift range is switched from the P range to the NotP range at time x10, the control mode is switched from the standby mode to the normal time feedback control mode. Further, the target count value θcmd corresponding to the target shift range is set, and the motor 10 is driven by the normal time feedback control mode. In the normal time feedback control mode, the energized phase is switched according to the encoder count value θen. In addition, the phase correction control is performed according to the motor rotation speed and the like.

If an encoder abnormality occurs at time x11, the encoder abnormality flag is turned on. Further, the driving of the motor 10 is continued in the faulty phase identification mode. When the faulty phase is identified by the time x12 and the faulty phase identification process is completed at the time x12, the motor 10 is driven in the fault time feedback control mode after the time x12. The fault time feedback control mode will be described in detail with reference to FIG. 12. If the encoder abnormality occurs while the motor is being driven and the mode shifts from the faulty phase identification mode to the fault time feedback control mode, the first time energization of S301 to S305 is not performed.

When the motor 10 reaches the target position at time x13, the mode shifts to the stop control mode. In the stop control mode, the motor 10 is reliably stopped by, for example, fixed phase energization. After performing the stop control over the stop control time, the mode is switched to the standby mode at time x14, and the energization of the motor 10 is turned off.

Figure 12:
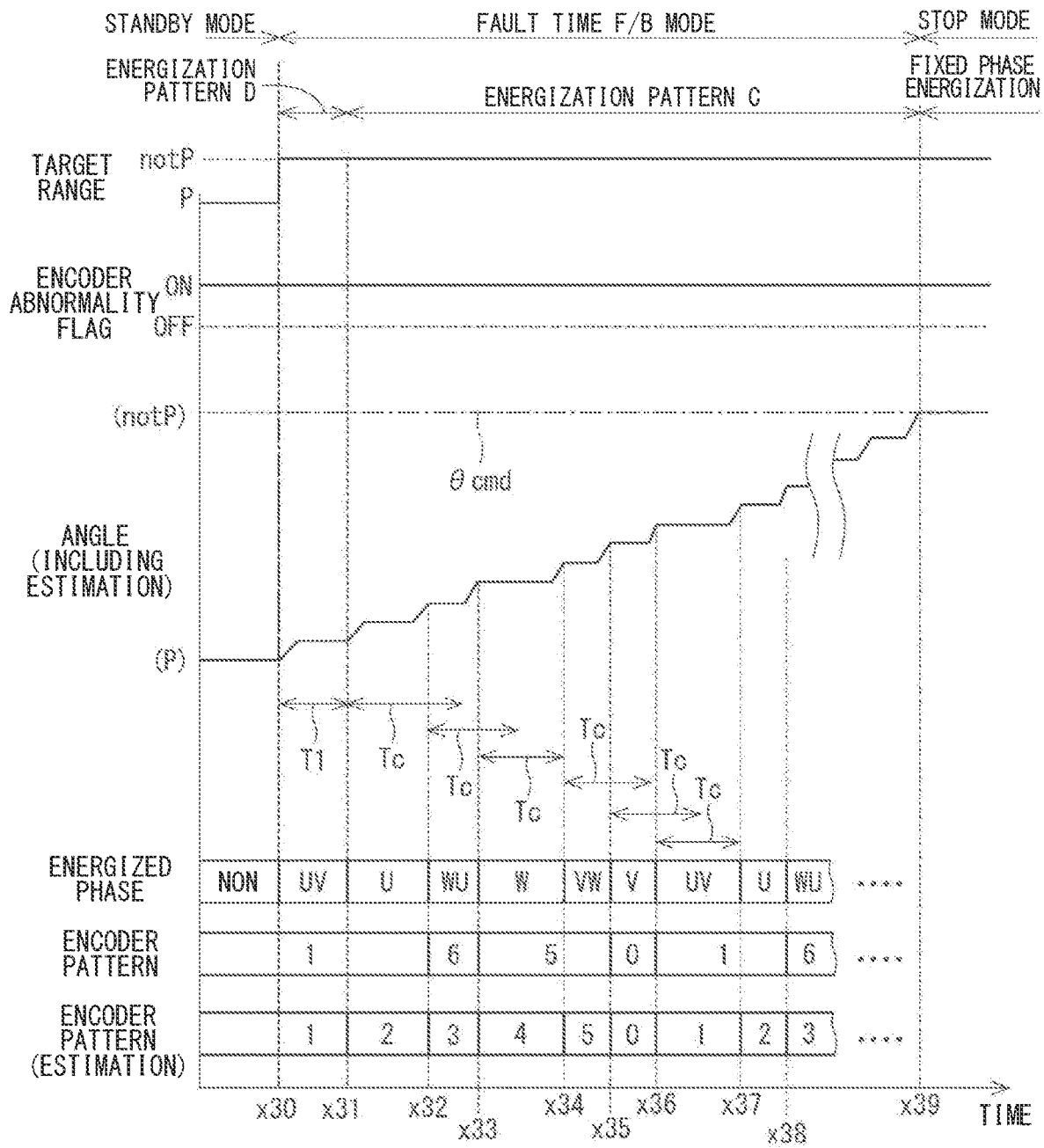
FIG. 12 is a time chart illustrating a motor driving process when shift range switching is performed in a state where a faulty phase is identified according to the first embodiment.

FIG. 12 is a time chart for explaining a case where the shift range is switched in a state where the encoder abnormality is confirmed and the faulty phase is identified. FIG. 12 shows the target shift range, the encoder abnormality flag, the angle, and the energized phase, the actual encoder pattern, and the estimated encoder pattern from an upper row.

In FIG. 12, it is assumed that the C-phase signal has a Hi fixing abnormality. In this case, the patterns P2, P3, and P4 do not occur, but the pattern P6 occurs (see FIGS. 4, 6 and 7). Specifically, the pattern P1 is continued where the pattern P2 should be, the pattern P6 is where the pattern P3 should be, and the pattern P5 is where the pattern P4 should be.

When the target shift range is switched from the P range to the NotP range at time x30, the encoder abnormality flag is turned on, so the control mode is switched from the standby mode to the fault time feedback control mode. In the fault time feedback control mode, the specific phase is first energized at the first energization. Here, during the first time energization duration T1, the UV phase is energized as the specific phase, and the encoder pattern becomes P1.

At the time x31 when the first time energization duration T1 has elapsed, the energization phase is switched from the UV phase to the U phase. In this example, since the C-phase Hi fixing abnormality has occurred, the encoder pattern continues to be the pattern P1. If the pulse edge of the normal phase is detected before the first time energization duration T1 elapses, the energized phase is switched at the edge detection timing.

At time x32, which is the timing before the energization switching time Tc elapses from time x31, the rising edge of the A-phase signal is detected, and the encoder pattern becomes P6. Although the pattern P6 is an abnormal pattern, since the C-phase Hi fixing is specified, the pattern P6 is treated as the pattern P3 from the energization order. Further, since the A-phase signal is normal, the energized phase is switched from the U-phase to the WU-phase at time x32, which is the edge detection timing of the A-phase signal.

At time x33, which is the timing before the elapse of the energization switching time Tc from the time x32, the falling edge of the B-phase signal is detected and the encoder pattern becomes P5, but since the C-phase Hi fixing is identified, the pattern P5 is treated as the pattern P4 from the energization order. Further, since the B-phase signal is normal, the energized phase is switched from the WU phase to the W phase at time x33, which is the edge detection timing of the B-phase signal. In the present embodiment, the energization switching time Tc is variable according to the motor rotation speed, and the motor rotation speed is larger at the time x32 than the time x31. Therefore, the energization switching time Tc set at the time x32 is smaller than the value set at time x31. Further, it is assumed that the motor rotation speeds at time x32 to time x38 are equal and the values of the set energization switching time Tc are equal.

If the encoder 13 is normal, the rising edge of the C phase should be detected next, but this edge cannot be detected in the state where the Hi fixing abnormality of the C phase has occurred. Therefore, the energized phase is switched from the W phase to the VW phase at the time x34 when the energization switching time Tc has elapsed from the time x33. At this time, even if the energized phase is switched, the encoder pattern continues to be P5.

At time x35, since the normal falling edge of the A phase is detected, the encoder pattern is switched from P5 to P0, and the energized phase is switched from the VW phase to the V phase. At time x36, since the rising edge of the B phase, which is normal, is detected, the encoder pattern is switched from P0 to P1, and the energized phase is switched from the V phase to the UV phase.

If the encoder 13 is normal, the falling edge of the C phase should be detected next, but this edge cannot be detected in the state where the Hi fixing abnormality of the C phase has occurred. Therefore, the energized phase is switched from the UV phase to the U phase at the time x37 when the energization switching time Tc has elapsed from the time x36. At this time, even if the energized phase is switched, the encoder pattern P1 is continued, but the pattern P1 is treated as the pattern P2 from the energization order.

At time x38, as at time x32, the energized phase is switched from the U phase to the WU phase based on the rising edge of the A phase. After that, the motor 10 is rotated to the target position by switching the energized phase in the same manner. When the motor 10 reaches the target position at time x39, the mode shifts to the stop control mode. Since the subsequent process is the same as the process after the time x13 in FIG. 11, the description thereof will be omitted.

In the present embodiment, the three-phase encoder is used as the encoder 13, and the energized phase is uniquely determined with respect to the encoder pattern. Therefore, the faulty phase is identified by performing the faulty phase identification control. In addition, after identifying the faulty phase, the feedback control using the encoder signal of the normal phase is continued. Specifically, at the edge detection timing of the normal phase, the energized phase is switched in the same manner as the normal time feedback control. Further, since the edge of the faulty phase cannot be detected, the energized phase is switched at the timing when the energization switching time Tc has elapsed from the edge detection timing of the normal phase. As a result, the responsiveness can be improved as compared with the case where the motor 10 is driven by open control.

As described above, the shift range control device 40 according to the present embodiment controls the switching of the shift range by controlling the driving of the motor 10, and includes the signal receiver 51, the abnormality monitor 52, and the drive controller 55.

The signal receiver 51 acquires the encoder signal from the encoder 13 capable of outputting three or more encoder signals having different phases. The abnormality monitor 52 monitors an abnormality of the encoder 13. The drive controller 55 controls the drive of the motor 10 by switching the energized phase of the motor winding 11 so that the rotation position of the motor 10 becomes the target rotation position according to the target shift range. When an abnormality of the encoder 13 is detected, the shift range control device 40 drives the motor 10 by the faulty phase identification control, and identifies the faulty phase, which is the phase in which an abnormality has occurred in the encoder 13, and the normal phase in which the encoder signal is normal. As a result, the abnormality of the encoder 13 is appropriately identified, and the use of the encoder signal in the normal phase can be continued, so that the influence at the time of the encoder abnormality can be minimized and the shift range can be appropriately switched.

When the encoder 13 is normal, the drive controller 55 controls the drive of the motor 10 by the normal time feedback control that switches the energized phase based on the encoder signals of all the phases, and when the faulty phase is identified, the drive controller 55 controls the drive of the motor 10 by the fault time feedback control that switches the energized phase based on the encoder signal of the normal phase. As a result, even when the encoder abnormality occurs, the motor 10 can be rotated accurately and quickly based on the encoder signal of the normal phase as compared with the open control in which the encoder signal is not used at all.

In the fault time feedback control, the drive controller 55 switches the energized phase at the timing when the pulse edge of the encoder signal of the normal phase is detected (S312 in FIG. 10), and in a case where the pulse edge to be detected next is the faulty phase, the energized phase is switched when the energization switching time Tc elapses after the pulse edge of the normal phase is detected (S316). As a result, the energized phase can be appropriately switched by using the encoder signal of the normal phase.

The energization switching time Tc is variable according to the rotation speed of the motor 10. As a result, the motor 10 can be driven in a state closer to the state in the normal time feedback control during the fault time feedback control, so that a decrease in responsiveness can be suppressed.

The drive controller 55 performs the phase correction control for advancing or retarding the phase of the energized phase in normal time feedback control, and does not perform the phase correction control in the fault time feedback control. As a result, the motor 10 can be rotated at a stable speed.

If it is determined that the pulse edge of the faulty phase is generated at an appropriate timing during the fault time feedback control (S310: YES), the faulty phase is restored to normal. In other words, in the present embodiment, the pulse edge of the faulty phase is continuously monitored even during the fault time feedback control. As a result, it is possible to appropriately recover from a temporary abnormality such as noise.

If the pulse edge of the faulty phase is detected before the faulty phase is restored to normal during the fault time feedback control, the pulse edge of the faulty phase is skipped and the energized phase is maintained. As a result, malfunction due to noise or the like can be prevented.

When the fault time feedback control is performed from the start of shift range switching, the first time energization control for maintaining energization to any two or one phase is performed. In the present embodiment, the UV phase is energized as any two phases by the first time energization control, but VW phase energization or WU phase energization may be performed. Two-phase energization is preferable because it is easier to stabilize the rotor position, but one-phase energization may be performed. As a result, the motor drive can be smoothly started regardless of the rotor position at the start of energization.

When it is determined that the rotation position of the motor 10 has reached the target rotation position, the motor 10 is stopped by the fixed phase energization control. As a result, the motor 10 can be stopped at an appropriate rotation position according to the target shift range.

Second Embodiment

Figure 13:
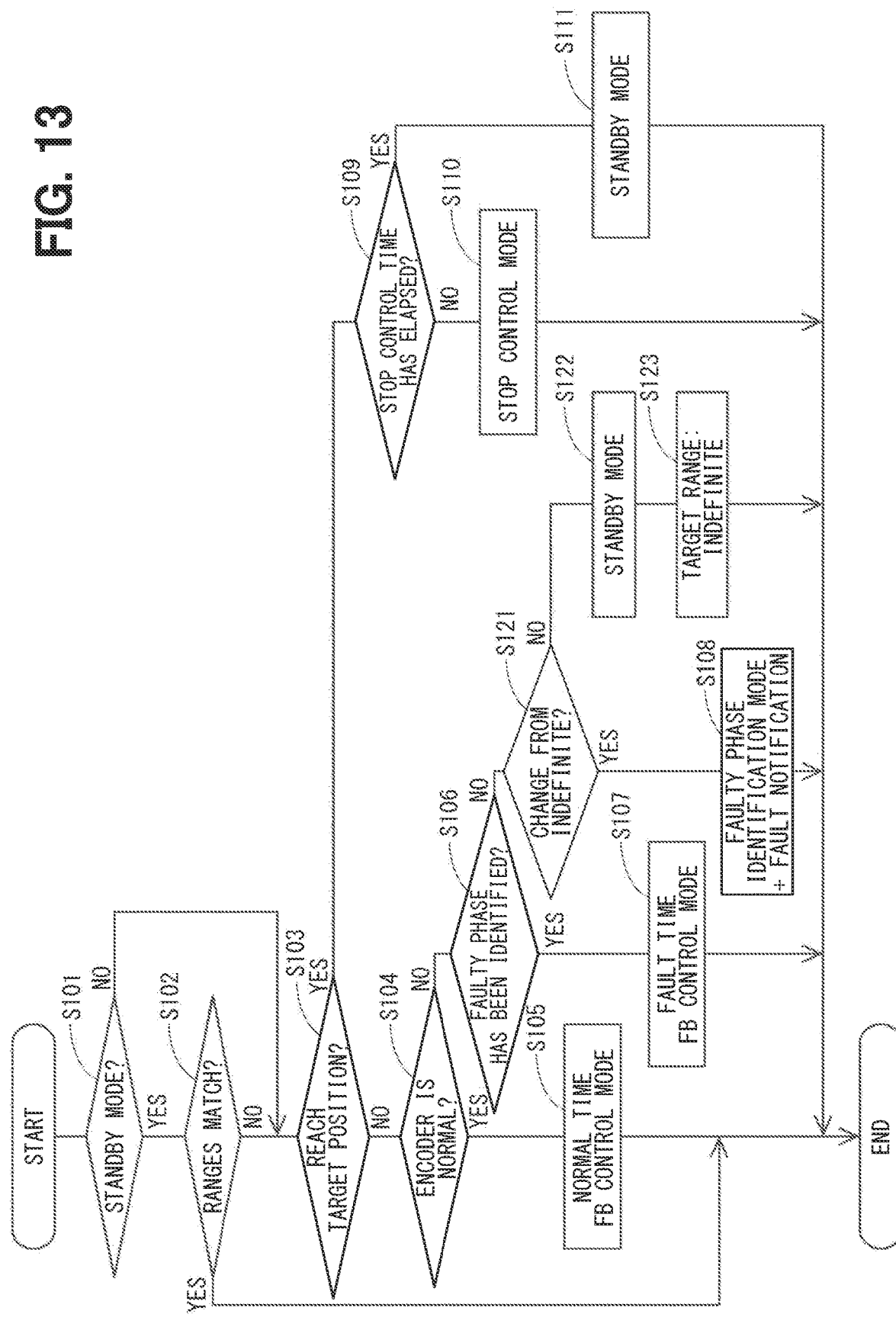
FIG. 13 is a flowchart illustrating a mode selection process according to a second embodiment.
Figure 14:
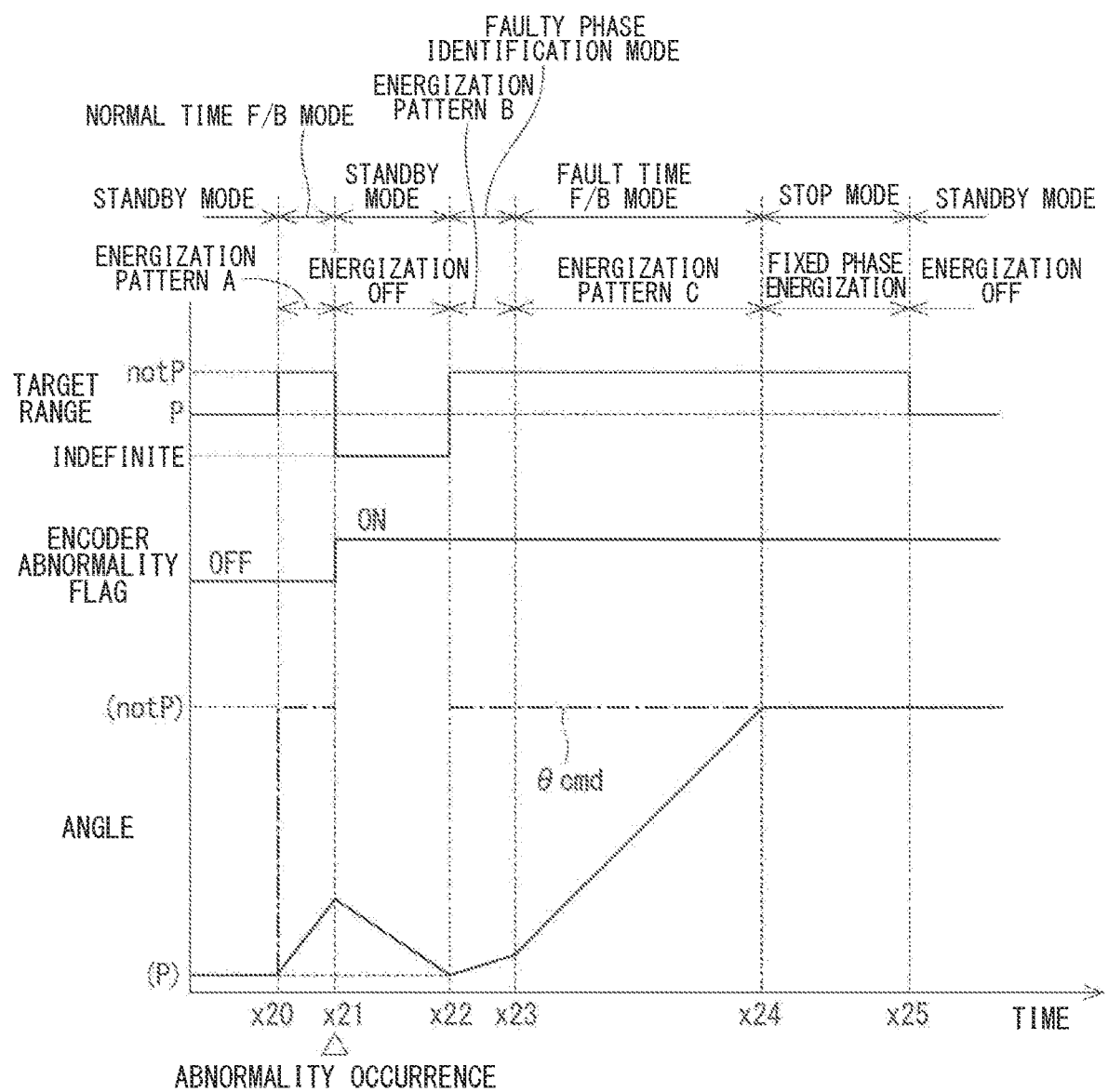
FIG. 14 is a time chart illustrating a motor driving process according to the second embodiment.

A second embodiment is shown in FIGS. 13 and 14. In the present embodiment, when an encoder abnormality occurs, a power source is temporarily turned off before the faulty phase identification process is performed, which is different from the above-described embodiment. Therefore, this point will be mainly described. Specifically, when an encoder abnormality occurs, information indicating that the abnormality has occurred is notified to the higher-level ECU, and the target shift range is undefined. Then, when the target shift range is set again from the higher-level ECU and the target shift range and the actual range do not match, after the faulty phase identification mode is performed, and the motor 10 is driven by the fault time feedback control and the shift range is switched.

Figure 8:
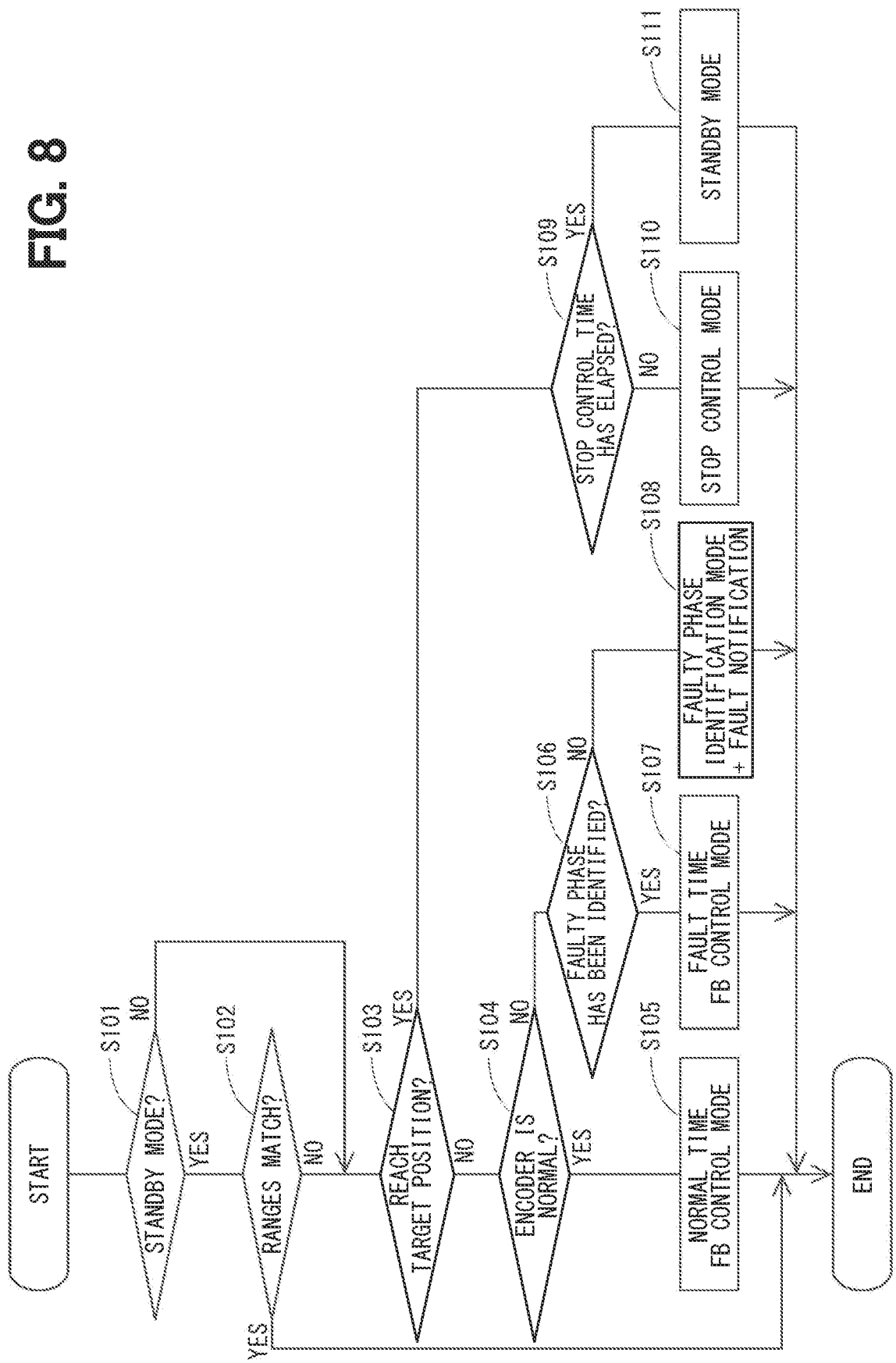
FIG. 8 is a flowchart illustrating a mode selection process according to the first embodiment.

A mode selection process of FIG. 13 is different from that of FIG. 8 in that S121 to S123 are added. In S106 to which the process proceeds when it is determined that the encoder 13 is not normal (S104: NO), it is determined whether or not the faulty phase has been identified. When it is determined that the faulty phase has been identified (S106: YES), the process proceeds to S107, and the control mode is set to the fault time feedback control mode. When it is determined that the faulty phase has not been identified (S106: NO), the process proceeds to S121.

In S121, the ECU 50 determines whether or not the target shift range has changed from indefinite. When it is determined that the target shift range has changed from indefinite (S121: YES), the process proceeds to S108, and the control mode is set to the faulty phase identification mode. When it is determined that the target shift range is the same as the target shift range at the time of the previous process (S121: NO), the process proceeds to S122 and the control mode is set to the standby mode. If the control mode is already the standby mode, the standby mode is continued. In S123, the ECU 50 switches the target shift range to indefinite, and notifies the higher-level ECU of information that the target shift range is indefinite. If the target shift range is already indefinite, the target shift range is continued to be indefinite.

A motor driving process according to the present embodiment will be described with reference to the time chart of FIG. 14. When the target shift range is switched from the P range to the NotP range at the time x20, the motor 10 is started to be driven in the normal time feedback control mode as in the time x10 of FIG. 11.

When an encoder abnormality occurs at time x21, the encoder abnormality flag is turned on, the control mode is temporarily set to the standby mode, and the energization of the motor 10 is cut off. In addition, the target shift range is set to be indefinite. In the example of FIG. 14, when the energization to the motor 10 is cut off, the detent roller 26 returns to the recess 23 corresponding to the P range due to the spring force of the detent spring 25 (see FIG. 2).

When a command to set the target shift range to the NotP range is acquired from the higher-level ECU at time x22, the motor 10 is started to be driven in the faulty phase identification mode. The process after the time x23 when the faulty phase identification processing is completed is the same as the process after x12 in FIG. 11. When the motor 10 is driven by the fault time feedback control mode and reaches the target position at the time x24, the motor 10 is stopped in the stop control mode. Then, after the stop control is performed, the mode is switched to the standby mode at time x25, and the energization to the motor 10 is cut off.

In the example of FIG. 14, the detent roller 26 returns to the recess 23 when the energization is cut off at the time x21. However, depending on the position where the encoder abnormality occurs, the detent roller 26 may be dropped into the recess 22 corresponding to the NotP range due to the spring force of the detent roller 26. In this case, when a command to set the target shift range to NotP is acquired from the higher-level ECU at time x22, the target shift range and the actual range match, and an affirmative determination is made in S102 in FIG. S13, and the subsequent process is not performed. Therefore, the faulty phase identification process will be performed when the target shift range is switched to the P range next time.

In the present embodiment, when an abnormality of the encoder 13 is detected while driving the motor 10, the energization to the motor 10 is cut off, and then the faulty phase identification control is performed. As a result, the fault phase identification control can be appropriately performed regardless of the driving state of the motor 10. The present embodiment also provides the same advantage as the above-described embodiment.

Other Embodiments

In the above-described embodiments, in the fault time feedback control, the energization switching time is variable according to the motor rotation speed. In another embodiment, the energization switching time may be a predetermined time regardless of the motor rotation speed. In this case, the processes of S306 and S307 in FIG. 10 may be omitted.

In the above-described embodiments, the phase correction control to set the phase correction amount, which is the phase lead amount and the phase delay amount, to be variable is performed during the normal time feedback control, and the phase correction control is not performed during the fault time feedback control. In another embodiment, in particular, when the energization switching time is set to be variable according to the motor rotation speed, the phase correction control may be performed even during the fault time feedback control. As a result, the motor drive state in the fault time feedback control can be brought closer to the normal time feedback control.

In the above-described embodiments, the pulse edge of the faulty phase is monitored even during the fault time feedback control, and when the edge becomes appropriate, the faulty phase is restored to normal. In another embodiment, the processes of S310 and S311 in FIG. 10 may be omitted, and if a negative determination is made in S309, the process may proceed to S315 so that the faulty phase is restored to normal. As a result, erroneous restoration can be prevented.

Figure 10:
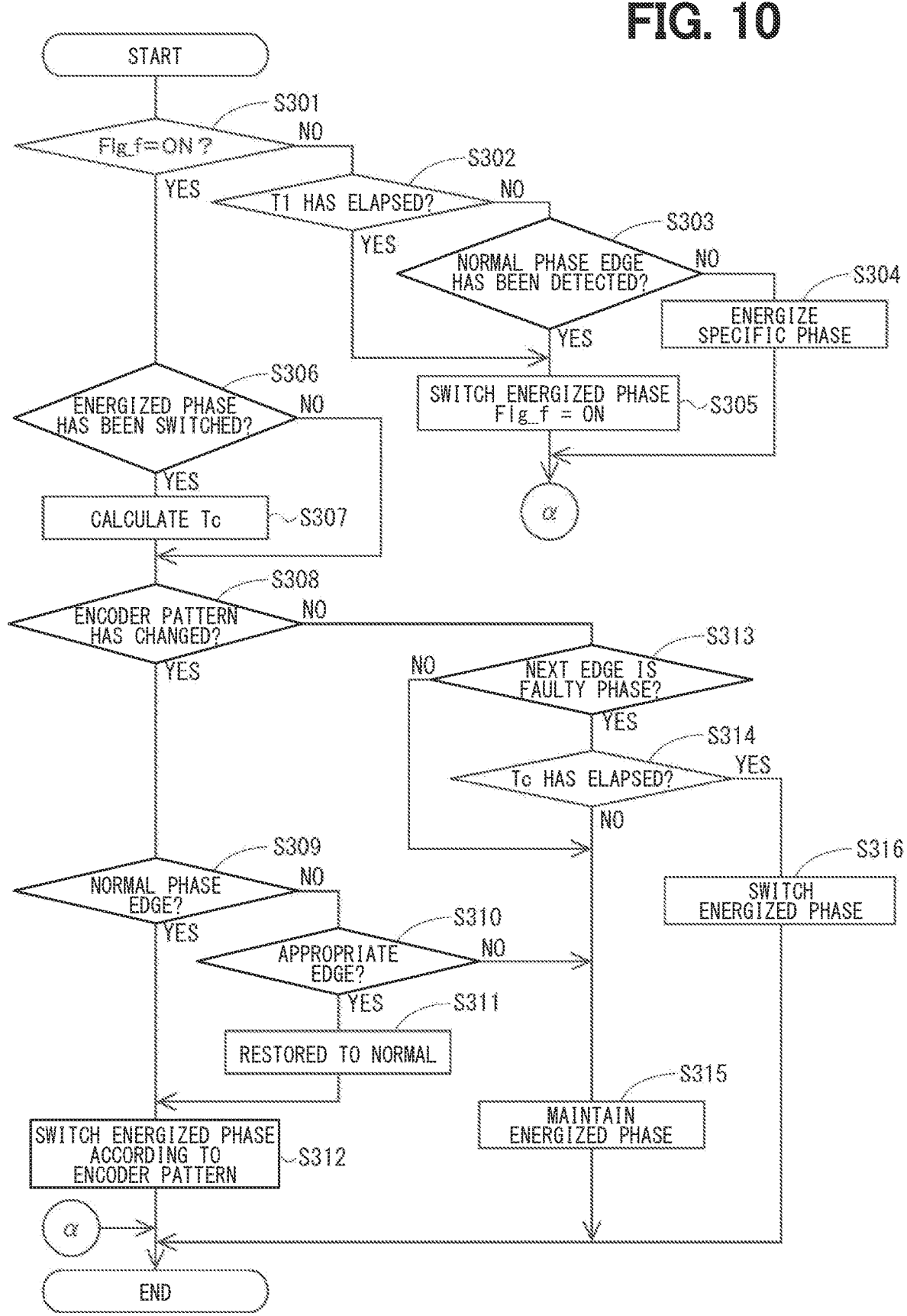
FIG. 10 is a flowchart illustrating a fault time feedback process according to the first embodiment.

In the above-described embodiments, when fault time feedback control is performed from the start of shift range switching, the first time energization control is performed (S301 to S305 in FIG. 10). In another embodiment, the processes of S301 to S305 may be omitted, and the first time energization control may not be performed.

In the above-described embodiments, the detent plate is provided with two recesses. In another embodiments the number of recesses is not limited to two, and for example, a recess may be provided for each range. The shift range switching mechanism, the parking lock mechanism, and the like may be different from those of the above-described embodiments.

In the above-described embodiments, the speed reducer is provided between the motor shaft and the output shaft. Although the detail of the speed reducer is not mentioned in the above-described embodiments, the speed reducer may have any configuration, such as one using a cycloid gear, a planetary gear, or a spur gear that transmits a torque from a speed reduction mechanism substantially coaxial with the motor shaft to the drive shaft, and one using these gears in combination. In another embodiment, the speed reducer between the motor shaft and the output shaft may be omitted, or a mechanism except for the speed reducer may be provided. As described above, the present disclosure is not limited to the above-described embodiments, and can be implemented in various forms without departing from the spirit of the present disclosure.

The controller and the technique according to the present disclosure may be achieved by a dedicated computer including a processor and a memory programmed to execute one or more functions embodied by a computer program. Alternatively, the controller and the technique according to the present disclosure may be achieved by a dedicated computer including a processor with one or more dedicated hardware logic circuits. Alternatively, the controller and the technique according to the present disclosure may be achieved using one or more dedicated computers constituted by a combination of a processor and a memory programmed to execute one or more functions and a processor with one or more hardware logic circuits. The computer program may also be stored on a computer-readable non-transitory tangible recording medium as instructions to be executed by a computer.

The present disclosure has been described in accordance with the embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A shift range control device for controlling switching of a shift range by controlling drive of a motor having a three-phase motor winding, the shift range control device comprising:
    a signal receiver configured to acquire an encoder signal from an encoder capable of outputting three or more phase encoder signals having different phases;
    an abnormality monitor configured to monitor an abnormality of the encoder; and
    a drive controller configured to control the drive of the motor by switching an energized phase of the motor winding so that a rotation position of the motor becomes a target rotation position according to a target shift range, wherein
    when the abnormality monitor detects the abnormality of the encoder, the drive controller drives the motor by a faulty phase identification control to identify a faulty phase that is a phase in which an abnormality of the encoder signal occurs and a normal phase in which the encoder signal is normal,
    when the encoder is normal, the drive controller controls the drive of the motor by a normal time feedback control in which the energized phase is switched based on the encoder signals of all the phases,
    when the drive controller has identified the faulty phase, the drive controller controls the drive of the motor by a fault time feedback control in which the energized phase is switched based on the encoder signal of the normal phase, and
    when the drive controller determines that a pulse edge of the faulty phase is generated at an appropriate timing during the fault time feedback control, the drive controller restores the faulty phase to normal.

2. The shift range control device according to claim 1, wherein
    when the drive controller detects the pulse edge of the faulty phase before restoration of the faulty phase to normal during the fault time feedback control, the drive controller skips the pulse edge of the faulty phase and maintains the energized phase.

3. The shift range control device according to claim 1, wherein
    when the drive controller performs the fault time feedback control from a start of switching of the shift range, the drive controller performs a first time energization control for maintaining energization to any two or one phase.

4. The shift range control device according to claim 1, wherein
    when the abnormality monitor detects the abnormality of the encoder during driving of the motor, the drive controller performs the faulty phase identification control after cutting off energization to the motor.

5. The shift range control device according to claim 1, wherein
    in the fault time feedback control, the drive controller switches the energized phase at a timing when a pulse edge of the encoder signal of the normal phase is detected, and when a pulse edge to be detected next is a pulse edge of the faulty phase, the drive controller switches the energized phase when an energization switching time has elapsed after the pulse edge of the normal phase is detected.

6. The shift range control device according to claim 5, wherein
    the energization switching time is variable according to a rotation speed of the motor.

7. The shift range control device according to claim 1, wherein
    the drive controller performs a phase correction control for advancing or retarding a phase of the energized phase in the normal time feedback control, and
    the drive controller does not perform the phase correction control in the fault time feedback control.

8. The shift range control device according to claim 1, wherein
    when the drive controller determines that the rotation position of the motor has reached the target rotation position, the drive controller stops the motor by a fixed phase energization control.

9. The shift range control device according to claim 1, wherein
    the signal receiver, the abnormality monitor, and the controller are achieved by a processor and a memory that stores a program executed by the processor.

10. The shift range control device according to claim 1, wherein the signal receiver, the abnormality monitor, and the drive controller are achieved by a processor with one or more hardware logic circuits.

11. The shift range control device according to claim 1, wherein
the signal receiver, the abnormality monitor, and the drive controller are achieved by a combination of a processor, a memory that stores a program executed by the processor, and one or more hardware logic circuits.

12. A shift range control device for controlling switching of a shift range by controlling drive of a motor having a three-phase motor winding, the shift range control device comprising:
a signal receiver configured to acquire an encoder signal from an encoder capable of outputting three or more phase encoder signals having different phases;
an abnormality monitor configured to monitor an abnormality of the encoder; and
a drive controller configured to control the drive of the motor by switching an energized phase of the motor winding so that a rotation position of the motor becomes a target rotation position according to a target shift range, wherein
when the abnormality monitor detects the abnormality of the encoder, the drive controller drives the motor by a faulty phase identification control to identify a faulty phase that is a phase in which an abnormality of the encoder signal occurs and a normal phase in which the encoder signal is normal,
when the encoder is normal, the drive controller controls the drive of the motor by a normal time feedback control in which the energized phase is switched based on the encoder signals of all the phases,
when the drive controller has identified the faulty phase, the drive controller controls the drive of the motor by a fault time feedback control in which the energized phase is switched based on the encoder signal of the normal phase, and
when the drive controller performs the fault time feedback control from a start of switching of the shift range, the drive controller performs a first time energization control for maintaining energization to any two or one phase.

13. The shift range control device according to claim 12, wherein
when the abnormality monitor detects the abnormality of the encoder during driving of the motor, the drive controller performs the faulty phase identification control after cutting off energization to the motor.

14. The shift range control device according to claim 12, wherein
in the fault time feedback control, the drive controller switches the energized phase at a timing when a pulse edge of the encoder signal of the normal phase is detected, and when a pulse edge to be detected next is a pulse edge of the faulty phase, the drive controller switches the energized phase when an energization switching time has elapsed after the pulse edge of the normal phase is detected.

15. The shift range control device according to claim 14, wherein
the energization switching time is variable according to a rotation speed of the motor.

16. The shift range control device according to claim 12, wherein
the drive controller performs a phase correction control for advancing or retarding a phase of the energized phase in the normal time feedback control, and
the drive controller does not perform the phase correction control in the fault time feedback control.

17. The shift range control device according to claim 12, wherein
when the drive controller determines that the rotation position of the motor has reached the target rotation position, the drive controller stops the motor by a fixed phase energization control.

18. The shift range control device according to claim 12, wherein
the signal receiver, the abnormality monitor, and the drive controller are achieved by a processor and a memory that stores a program executed by the processor.

19. The shift range control device according to claim 12, wherein
the signal receiver, the abnormality monitor, and the drive controller are achieved by a processor with one or more hardware logic circuits.

20. The shift range control device according to claim 12, wherein
the signal receiver, the abnormality monitor, and the drive controller are achieved by a combination of a processor, a memory that stores a program executed by the processor, and one or more hardware logic circuits.

* * * * *